March 26, 1946.　　F. G. BUHRENDORF　　2,397,126
GEAR DRIVE MECHANISM
Filed April 27, 1944
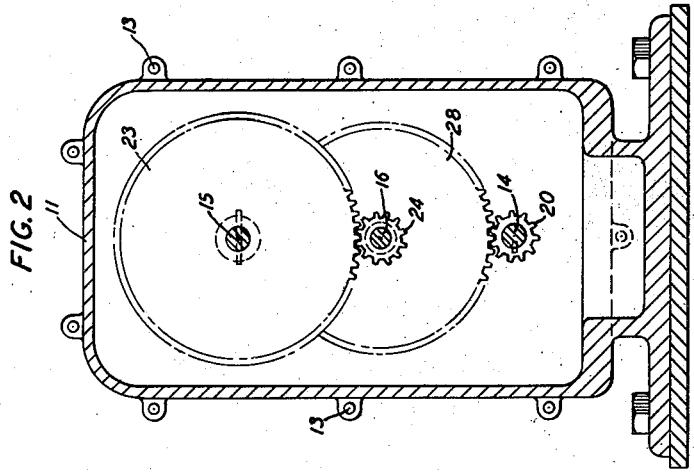
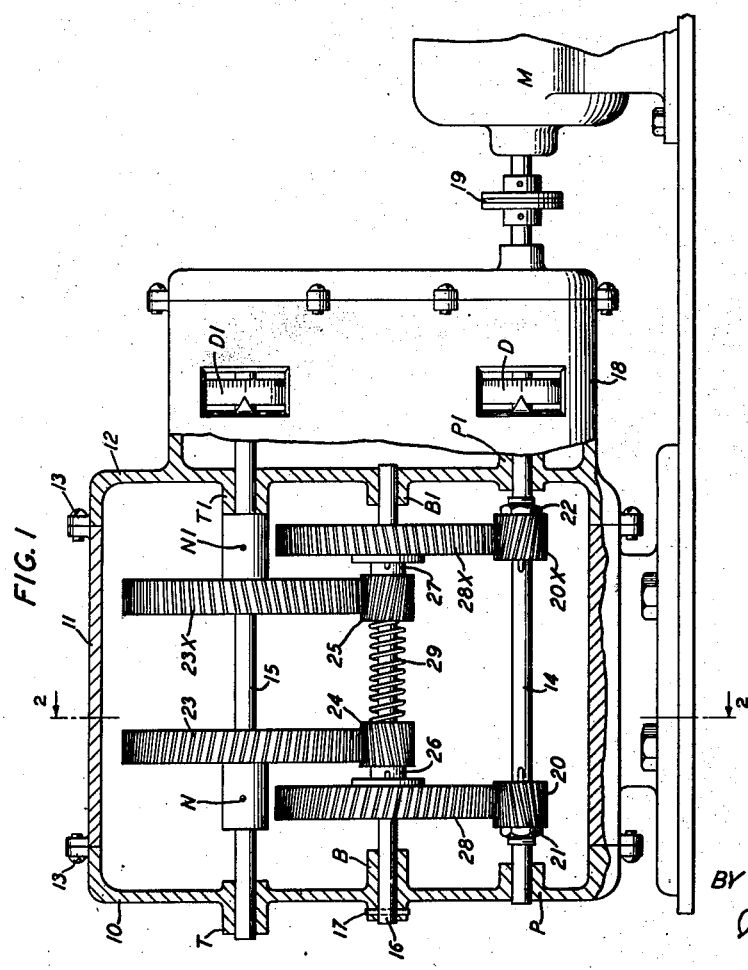
INVENTOR
F. G. BUHRENDORF
BY
*Walter C. Kiesel*
ATTORNEY Patented Mar. 26, 1946

2,397,126

UNITED STATES PATENT OFFICE 2,397,126

GEAR DRIVE MECHANISM

Frederick G. Buhrendorf, Hastings on Hudson, N. Y., assignor to Bell Telephone Laboratories, Incorporated, New York, N. Y., a corporation of New York Application April 27, 1944, Serial No. 532,960

5 Claims. (Cl. 74—409)

This invention relates to gear drive mechanisms.

The object of the invention is the provision of a gear drive arrangement whereby the slack between two operatively connected shafts due to the backlash of the gears is automatically taken up and positively eliminated.

In the drawing,

Fig. 1 is a front elevation view with the casing housing the gear mechanism shown in vertical longitudinal section; and Fig. 2 is a vertical sectional view taken on line 2—2 of Fig. 1.

The gearing arrangement of this invention may for example consist of casing elements 10, 11 and 12 secured in assembled relation to each other by a plurality of similar screws 13.

The casing elements 10 and 12 are formed with bearing portions P and P1 provided for rotatably supporting a shaft 14 and bearing portions T and T1 for rotatably supporting a shaft 15, while an intermediate shaft 16 is journaled in bearings B and B1, but held from rotary movement therein by a pin 17 shown in Fig. 2.

One end of shaft 14 extends into a casing 18 formed with casing portion 12 for connection for example with a registering apparatus in turn connecting with the armature shaft of motor M as by a coupling 19. Helical pinions 20 and 20X are keyed on shaft 14 but are movable longitudinally thereon as by nuts 21 and 22 for a purpose which will be hereinafter described in detail. On shaft 15 are mounted the helical gears 23 and 23X held against rotation thereon as by pins N and N1.

On shaft 16 are mounted for free rotation thereon the helical pinions 24 and 25 meshing with gears 23 and 23X keyed on shaft 15. Pinions 24 and 25 are formed with hub portions 25 and 27 on which are keyed the helical gears 28 and 28X for engagement with the helical pinions 20 and 20X respectively on shaft 14.

On shaft 16 between the helical pinions 24 and 25 is interposed a coiled spring 29, the function of which is to force the pinions 24 and 25 in engagement with their respective helical gears 23 and 23X and therefore the helical gears 28 and 28X with their meshing helical pinions 20 and 20X. Pinions 24 and 25 under the tension of spring 29 adjusting themselves automatically with their meshing gears 23 and 23X while the pinions 20 and 20X are adjusted to the required meshing pressure with their helical gears 28 and 28X by the nuts 21 and 22 on shaft 14 so that the inherent backlash between the gears in addition to the backlash due to the wearing of the gears while operation is automatically taken up by the forcing of the duplex arranged pinions and gears 24—28 and 25—28X thus formed with their meshing gears 23—23X and pinions 20—20X with the result that the shafts 14 and 15 and the dials D and D1 of the apparatus not shown which may be actuated by these shafts are constantly maintained in accurate operative relation to each other irrespective of the direction of rotation of the two shafts provided that the nuts 21 and 22 shown in Fig. 1 be placed on shaft 14 to the opposite side of pinions 20 and 20X in condition when the gear mechanism operates in the opposite direction or nuts like 21 and 22 may be disposed on the sides of each pinion 20 and 20X.

A ready understanding of the gearing arrangement of the invention may be had by considering the helical gears 23 and 23X secured on shaft 15 as forming a so-called herringbone gear meshing with a second herringbone pinion in the form of pinions 24 and 25. Similarly the helical gears 28 and 28X may be considered as herringbone gear meshing with another herringbone pinion in the form of pinions 20 and 20X keyed on shaft 14, so that the forcing of the pinions 24 and 25 in engagement with their meshing gears 23—23X and the helical gears 28 and 28X against the herringbone gear formed by the helical pinions 20 and 20X following their adjustment by the nuts 21 and 22 the backlash between the different gears is taken up by the longitudinal movement of the duplex gear units 24—28 and 25—28X under the tension of spring 29 and these forced in mesh with their corresponding gears 23—20 and 23X—20X and this as above mentioned irrespective of the direction of rotation of shafts 14 and 15 or the torque carried by these shafts provided the helix of the teeth of the helical gears and pinions is not substantially less than 20 degrees or exceed 45 degrees and that the tension of spring 29 is made proportional to the torque carried by shafts 14 and 15 and the helix chosen for the helical gears.

What is claimed is:

1. In a gearing mechanism, a pair of rotatable shafts, a stationary shaft, a pair of helical gears secured on one of said shafts, a pair of helical gears secured on the other of said shafts, a pair of duplex helical gear units mounted for free rotation on said stationary shaft and spring means for engaging said units with said helical gears on the first and second-mentioned shafts for taking up backlash.

2. In a gearing mechanism, a pair of rotatable shafts, a stationary shaft, helical gears keyed on said rotatable shafts, helical gears arranged in pairs mounted for rotation on said stationary shaft and interengaging with the gears mounted on said rotatable shafts and resilient means for pressing the helical gears on said stationary shaft into engagement with the helical gears keyed on said rotatable shafts for automatically taking up backlash between said gears.

3. In a gearing mechanism, a rotatable shaft, a pair of helical gears keyed on said shaft, another rotatable shaft, a pair of helical gears keyed on said other shaft, a stationary shaft, a pair of helical gears movable as a unit on said stationary shaft, one of said gears in said pair engaging with one of said gears on the first-mentioned rotatable shaft and the other gear in said pair with one of the gears on the second-mentioned rotatable shaft, another pair of helical gears movable as a unit on said stationary shaft, one of the said gears in said pair engaging with the other of said gears on said first-mentioned shaft and the other gear of the last mentioned pair with the other gear on said second-mentioned shaft, and spring means interposed between said gears in said pairs for pressing them into engaged relation with their respective meshing gears on the first and second-mentioned shafts for taking up backlash between said gears and thereby slack between the first and second-mentioned shafts.

4. In a gearing mechanism, a pair of rotatable shafts, a stationary shaft, a pair of duplex arranged helical gears mounted for free rotation on said stationary shaft, gears mounted on one of said rotatable shafts meshing with a gear of each of said duplex arranged gears, other gears mounted on the other of said rotatable shafts meshing with the other gears of said duplex arranged gears, and means carried by one of said rotatable shafts for controlling the engagement of the gears mounted thereon with their meshing gears of said duplex arranged gears.

5. In a gearing mechanism, a pair of rotatable shafts, a stationary shaft, a pair of duplex arranged helical gears mounted for free rotation on said stationary shaft, gears mounted on one of said rotatable shafts, each meshing with a gear of said duplex arranged gears, others gears mounted on the other of said rotatable shafts meshing with the other gears of said duplex arranged gears, means carried by one of said rotatable shafts for controlling the engagement of said other gears with the other gears of said duplex arranged gears and resilient means interposed between said pairs of duplex arranged gears for forcing them into engaged relations with the gears carried by said rotatable shafts for taking up backlash between said gears.

FREDERICK G. BUHRENDORF.